(12) United States Patent
Landino et al.

(10) Patent No.: US 7,434,328 B2
(45) Date of Patent: Oct. 14, 2008

(54) ROTOR BLADE CUFF MEASURING TOOL

(75) Inventors: Frank Mario Landino, Shelton, CT (US); Bernardo Goncalves Rocha, West Haven, CT (US); Gianni Celli, Plainville, CT (US); Edward Robert Landino, Shelton, CT (US); Raymond M. Glazier, Jr., Milford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 722 days.

(21) Appl. No.: 11/040,461

(22) Filed: Jan. 21, 2005

(65) Prior Publication Data

US 2008/0201972 A1    Aug. 28, 2008

(51) Int. Cl.
*G01B 5/20* (2006.01)
*B64F 5/00* (2006.01)
(52) U.S. Cl. ............................... 33/530; 33/553; 33/569
(58) Field of Classification Search .................... 33/502, 33/503, 530, 550, 551, 553, 554, 555, 569, 33/573; 269/290, 900, 909
See application file for complete search history.

(56) References Cited

U.S. PATENT DOCUMENTS 2,686,370 A * 8/1954 Jack et al. ..................... 33/546
2,811,781 A * 11/1957 Carlsen et al. ................ 33/569
3,834,032 A * 9/1974 Sihvonen ...................... 33/550
4,146,967 A * 4/1979 Rohner et al. ................. 33/530
4,265,023 A * 5/1981 Frost et al. ................... 356/614
4,286,778 A * 9/1981 Follmeyer .................... 269/91
4,411,073 A * 10/1983 Ryan ........................... 33/530
4,577,499 A * 3/1986 Silke et al. ................. 73/865.8
4,583,891 A * 4/1986 Eschenfelder et al. ....... 409/120
4,642,901 A * 2/1987 Webb .......................... 33/530
5,152,071 A * 10/1992 Bergeron ..................... 33/530
5,926,781 A * 7/1999 Scott .......................... 702/151
2007/0107515 A1* 5/2007 Clubine ....................... 73/455

FOREIGN PATENT DOCUMENTS

DE            2935002 A1 * 3/1981

* cited by examiner

*Primary Examiner*—R. A. Smith
(74) *Attorney, Agent, or Firm*—Carlson, Gaskey & Olds (57) ABSTRACT

A measuring tool for a blade cuff mounted on a rotor blade assembly includes a cam follower assembly which simulates a longitudinal profile of an ideal blade cuff within a contour plane. A cam lock locks the gauge at a desired longitudinal position along a central axis to measure a radial plane defined around the blade cuff as the blade cuff profile fixture is rotated relative the base and cam follower assembly. A master block is removably mounted to the blade cuff fixture to simulate an ideal blade cuff such that the gauge may be zeroed thereon. Once zeroed, and after removal of the master block, the cam follower assembly provides a continuous zero position for the gauge such that any deviations from the ideal profile anywhere on the blade cuff is indicated on the gauge.

12 Claims, 8 Drawing Sheets

ROTOR BLADE CUFF MEASURING TOOL

BACKGROUND OF THE INVENTION

The present invention relates to a measuring tool and more particularly to a measuring tool which provides measurement of a rotor blade cuff without rotor blade disassembly.

A rotor blade spar is a primary structural element of a helicopter main rotor blade assembly inasmuch as its primary function is to transfer combined flapwise, edgewise, torsional and centrifugal loads to/from a central torque drive hub member. Typically, a leading edge and trailing edge assembly envelope the spar to yield a desired airfoil contour. The spar extends along the length of the rotor blade and mounts at its inboard end to a cuff assembly that facilitates mounting of the rotor blade to a rotor hub assembly. The cuffs are typically manufactured as one-piece members which are mechanically fastened and bonded to the blade spar and blade skins.

The blade cuffs are flight safety components which must be within predefined dimensional variation tolerances to ensure flight integrity. Oftentimes, the blade cuffs may become damaged through normal flight operations. Some dimensional variation is permissible within predetermined limits, and some damage may be repaired through accurate measurement of the damage depth, material removal, blend direction, and surface finish to maintain the strength integrity of the blade cuff.

When damage beyond predetermined limits occurs to the blade cuff, the blade cuff must be removed from the main rotor blade assembly to repair the blade cuff. Blade cuffs are typically mechanically fastened and bonded to the rotor blade and removal of the blade cuff is a relatively expensive and laborious procedure. Removing the blade cuff may also result in disbonding of the blade root laminate which may increase future disbonding of the rotor blade.

Disadvantageously, blade cuff damage beyond predetermined limits may be relatively difficult to identify which may result in disassembly of an acceptable blade cuff from a flight acceptable rotor blade assembly.

Accordingly, it is desirable to provide accurate in-situ measurement of a rotor blade cuff without necessitating disassembly of the blade cuff from the rotor blade assembly.

SUMMARY OF THE INVENTION

A measuring tool according to the present invention generally includes a base, a blade cuff fixture which rotates relative the base, a cam follower assembly and a gauge. The cam follower assembly is mounted to the base to support the gauge. The cam follower assembly simulates a longitudinal profile of an ideal blade cuff within a longitudinal contour plane. A cam lock locks the gauge at a desired vertical position along a central axis to measure a radial plane defined around the blade cuff as the blade cuff fixture is rotated relative the base and cam follower assembly.

A master block is removably mounted to the blade cuff fixture to simulate an ideal blade cuff such that the gauge may be zeroed thereon. Once zeroed, and after removal of the master block, the cam follower assembly provides a continuous zero position for the gauge such that any deviations from the ideal profile anywhere on the blade cuff are indicated on the gauge.

The present invention therefore provides accurate in-situ measurement of a rotor blade cuff without necessitating disassembly of the blade cuff from the rotor blade assembly.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
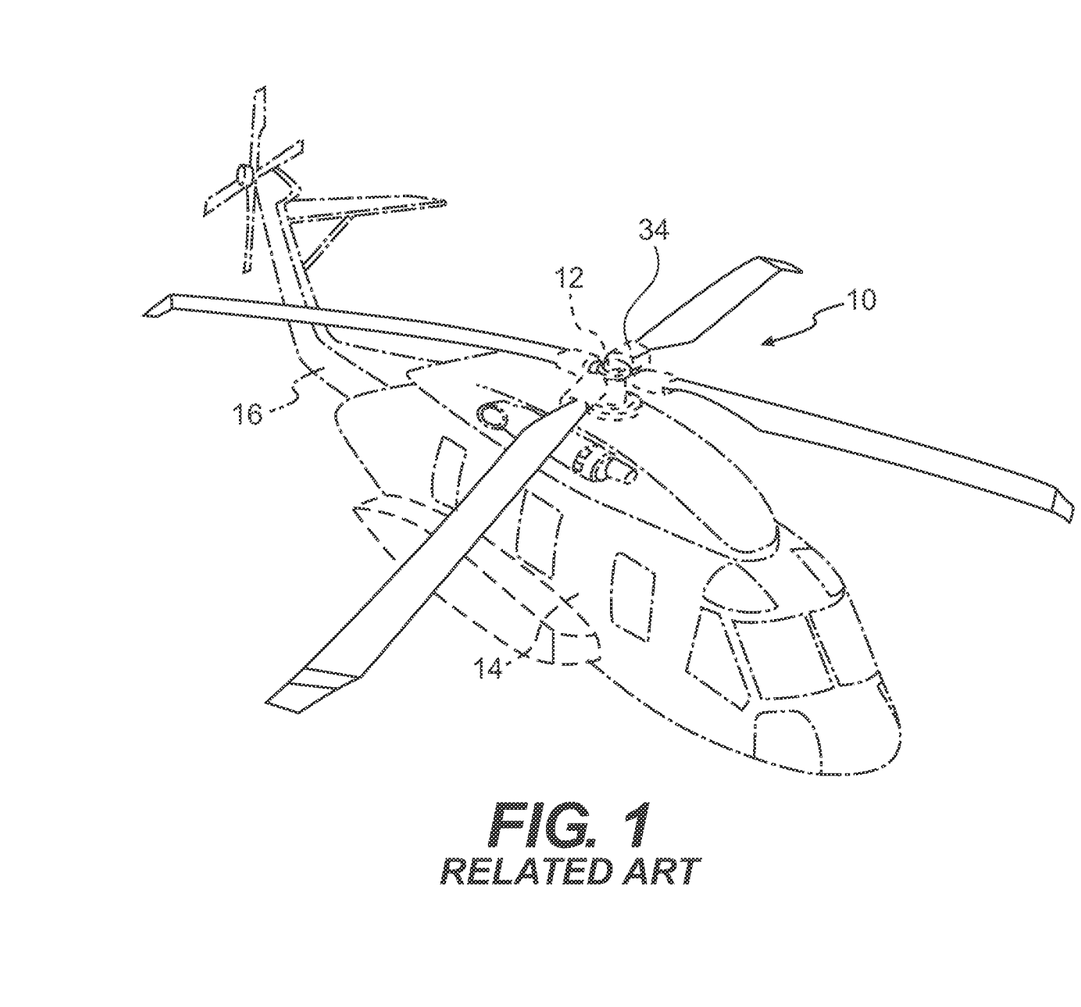
FIG. 1 is a general perspective view an exemplary related art rotary wing aircraft embodiment for use with the present invention.

FIG. 1 schematically illustrates a rotary-wing aircraft 10 having a main rotor assembly 12. The aircraft 10 includes an airframe 14 having an extending tail 16 which mounts an anti-torque tail rotor system 18. The main rotor assembly 12 is driven through a transmission (illustrated schematically at 20) by one or more engines 22. Although a particular helicopter configuration is illustrated in the disclosed embodiment, other machines such as turbo-props, tilt-rotor and tilt-wing aircraft will also benefit from the present invention.

Figure 2:
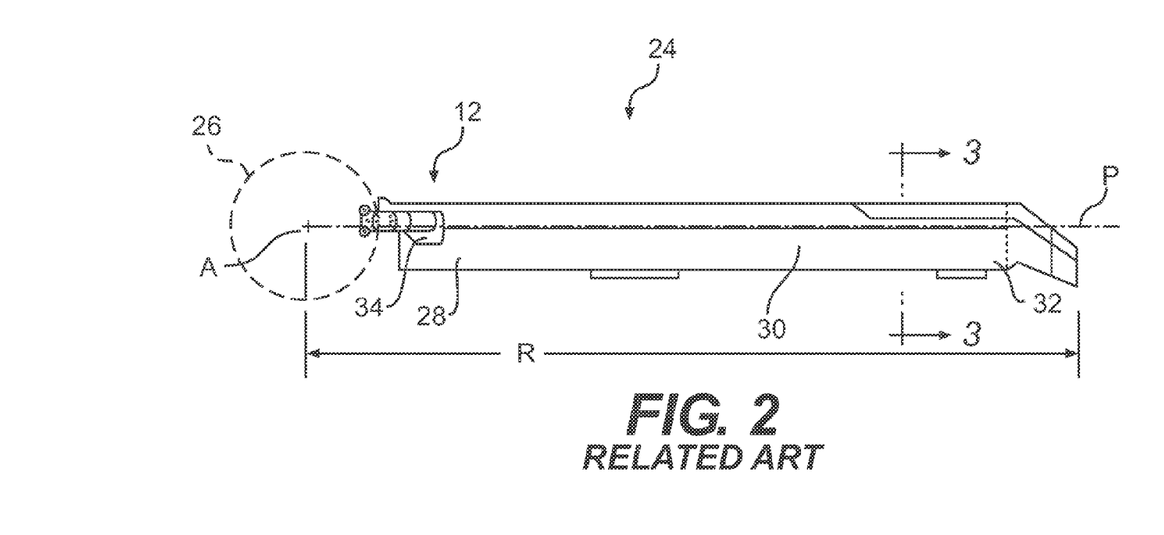
FIG. 2 is a top plan view of an exemplary related art main rotor blade assembly.

FIG. 2 schematically illustrates an exemplary main rotor blade assembly 24 mounted to a rotor hub assembly 26 of the main rotor assembly 12 for rotation about an axis of rotation A. The main rotor blade 24 includes an inboard section 28, an intermediate section 30, and an outboard section 32.

Figure 3:
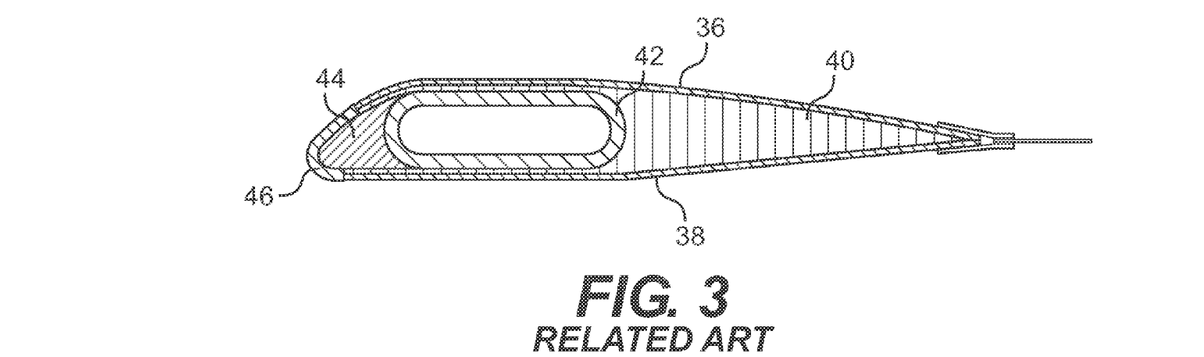
FIG. 3 is a cross-sectional view of the exemplary related art main rotor blade of FIG. 2 taken along line 2-2 thereof.

A blade cuff 34 is attached to the inboard section 28 to facilitate mounting of the rotor blade assembly 24 to the rotor hub assembly 26. The blade cuff 34 is preferably a one-piece machined metallic member which is bonded to the rotor blade assembly 24 to support the rotor blade which commonly includes an upper blade skin 36, a lower blade skin 38, a core 40, a spar 42, one or more counterweights 44, and a leading-edge sheath 46 which form the interior support of the skins 36, 38 (FIG. 3). It should be understood that although a main rotor blade assembly for a helicopter is illustrated in the disclosed embodiment, other applications such as tail rotors, propellers, turbines, windmills and the like will also benefit from the present invention.

Figure 4A:
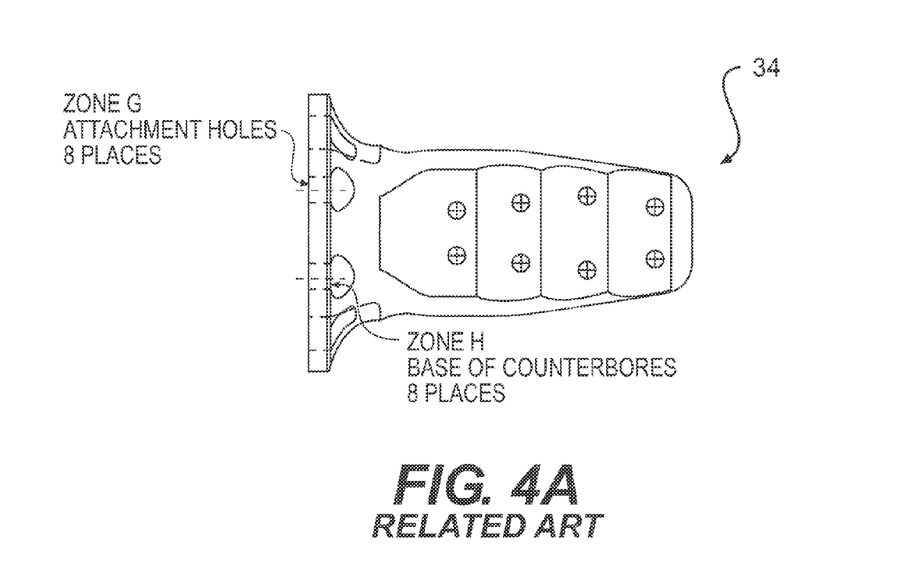
FIG. 4A is a top view of an exemplary related art rotor blade cuff.
Figure 4B:
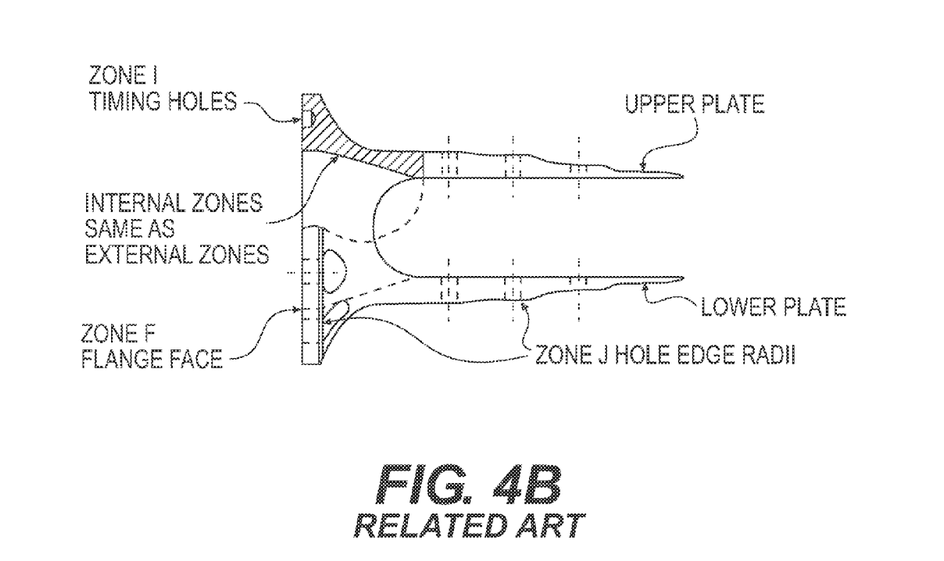
FIG. 4B is a side view of the exemplary related art rotor blade cuff of FIG. 4A.

Referring to FIG. 4, the blade cuff 34 includes a multiple of zones A-J. The blade cuff 34 is subject to damage through normal operation of the aircraft. The damage sustained by the blade cuff 34 must be accurately determined to ascertain whether the blade cuff 34 may be repaired through blending or the like. Each damage zone A-J defines a particular acceptable depth of damage which may be repaired. It should be understood that other zones may be defined and zones A-J are defined herein for illustrative purposes only. Typically, a maximum permitted depth is associated with each zone. Accurate determination of the depth of damage as measured by the measuring tool 50 (FIG. 5) of the present invention permits the safe repair of damaged blade cuffs 34 which may otherwise require replacement and/or return to a rearward area service depot.

Figure 5:
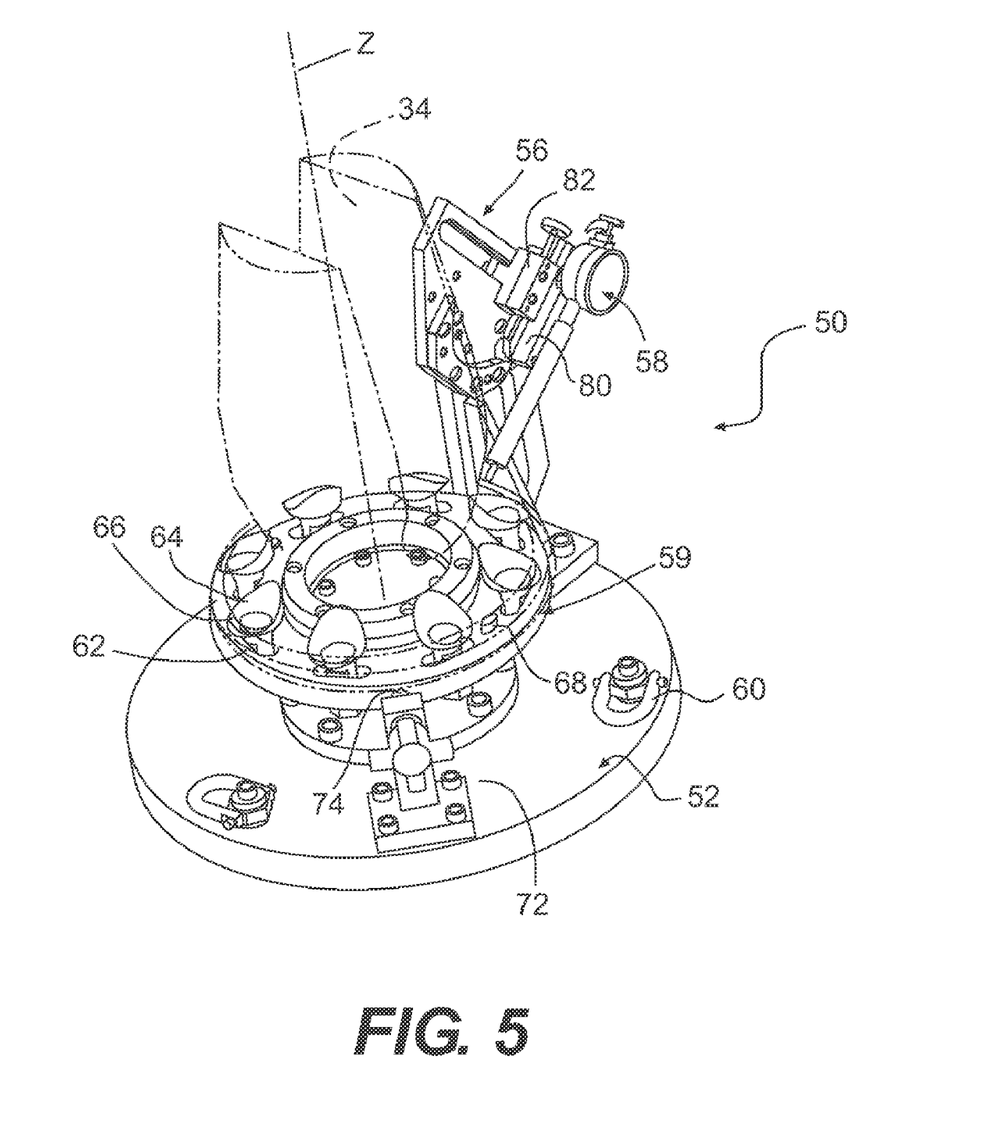
FIG. 5 is a perspective view of a blade cuff measuring tool according to the present invention.

Referring to FIG. 5, the measuring tool 50 generally includes a base 52 which defines an axis Z, a blade cuff fixture 54, a cam follower assembly 56 and a gauge 58. The measuring tool 50 provides accurate measurement of the blade cuff 34 which permits salvage of a damaged component through repairs in the field which increases turn-around time while minimizing expense.

Figure 6:
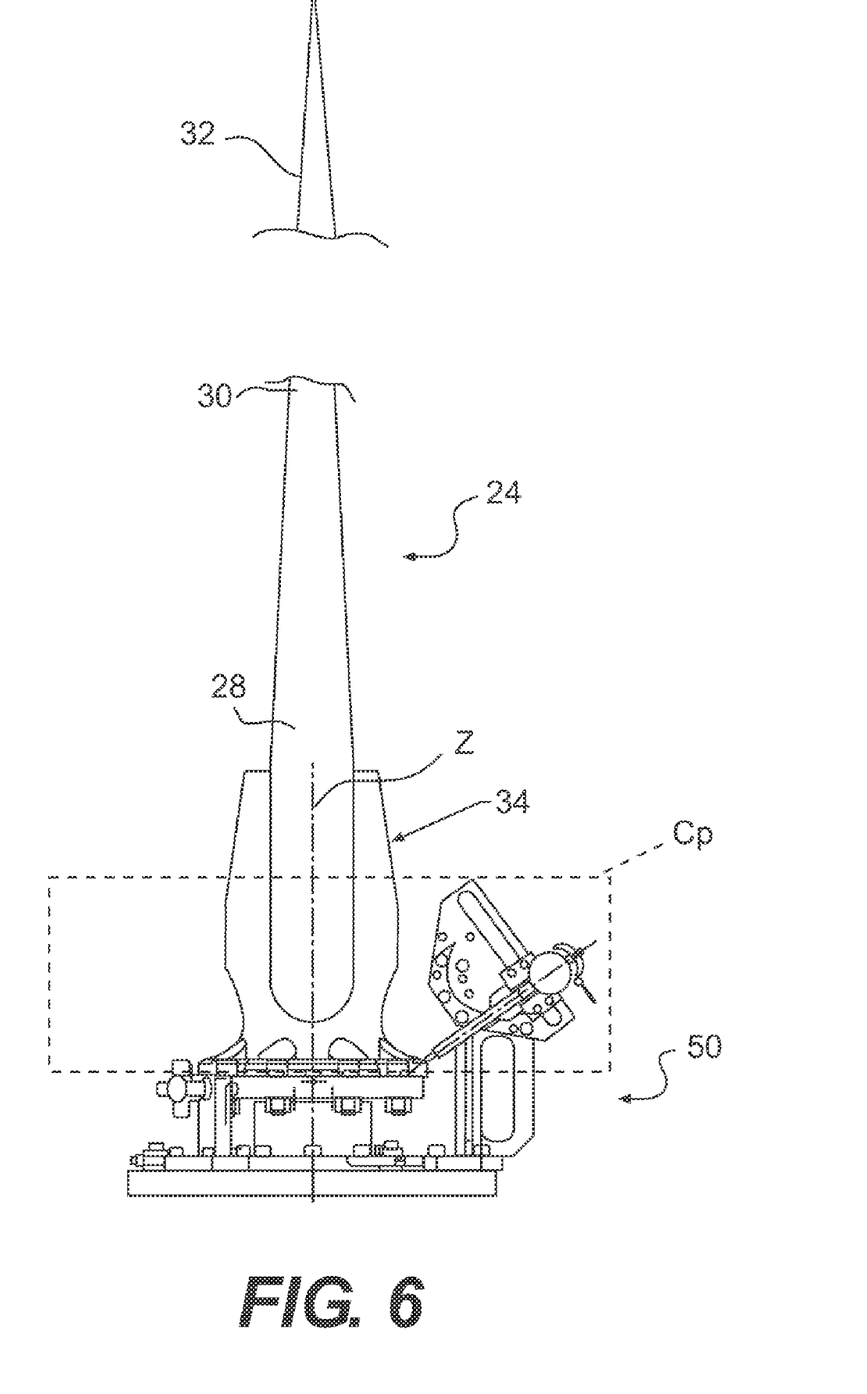
FIG. 6 is a side view of a blade cuff measuring tool according to the present invention with a rotor blade assembly attached thereto.

The base 52 supports the blade cuff fixture 54 for rotation about the axis Z. The base 54 is preferably relatively substantial as the entire rotor blade assembly 24 (FIG. 6) is mounted to the measuring tool 50 while measurements are determined. Lift lugs 60 are attached to the base to facilitate movement thereof.

The blade cuff fixture 54 is generally circular and includes a multiple of fastener apertures 62 which correspond to blade cuff attachment apertures 64 such that the blade cuff 34 is readily attached thereto though fasteners 66. Timing pins 68 extend from the blade cuff fixture 54 to correspond with timing holes 70 formed in the blade cuff 34 (FIG. 4). The blade cuff fixture 54 generally reproduces the attachment on the aircraft rotor hub assembly 26 (FIG. 2) such that the blade assembly 24 may be attached in the same fashion, however, any secure attachment other than fasteners may also be utilized.

A radial lock assembly 72 is mounted to the base 52 for selective engagement with the blade cuff fixture 54 to lock the blade cuff fixture 54 in a desired radial position. A friction engagement between a lock pin 74 (also illustrated in FIG. 7) and the blade cuff fixture 54 is preferred to provide infinitely variable radially position locking, however, other engagements may be likewise utilized.

Figures 8A, 8B:
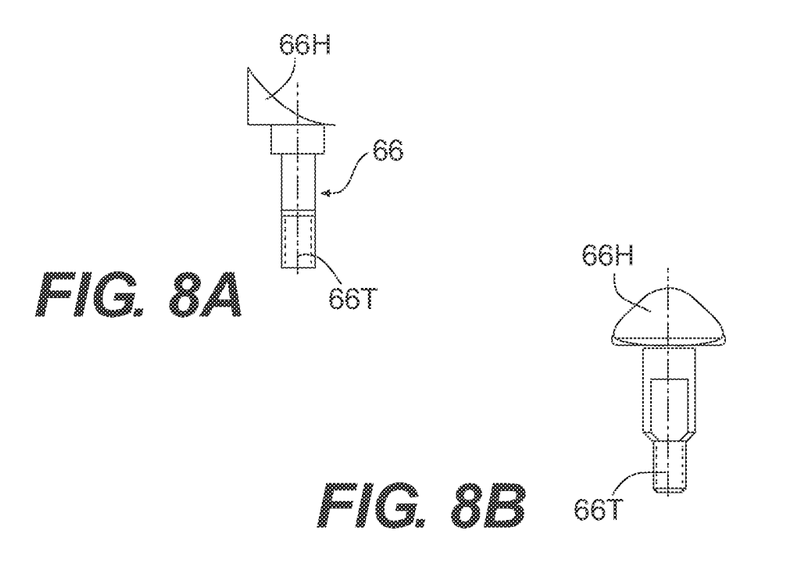
FIG. 8A is a side view of a fastener for use with the blade cuff measuring tool.
FIG. 8B is a front view of a fastener for use with the blade cuff measuring tool.

The fasteners 66 include fastener heads 66H having a profile which corresponds to a profile of the blade cuff 34 (also illustrated in FIGS. 8A and 8B). That is, when the fasteners 66 are utilized to mount the blade cuff 34 to the blade cuff fixture 54, the fastener heads 66H fill the blade cuff attachment apertures 64 to prevent snagging of the gauge 58 therein. The fasteners 66 are preferably threaded 66T to receive threaded nuts 66N (FIG. 9) such that the fastener heads 66H may be aligned within the blade cuff attachment apertures 64.

Figure 9:
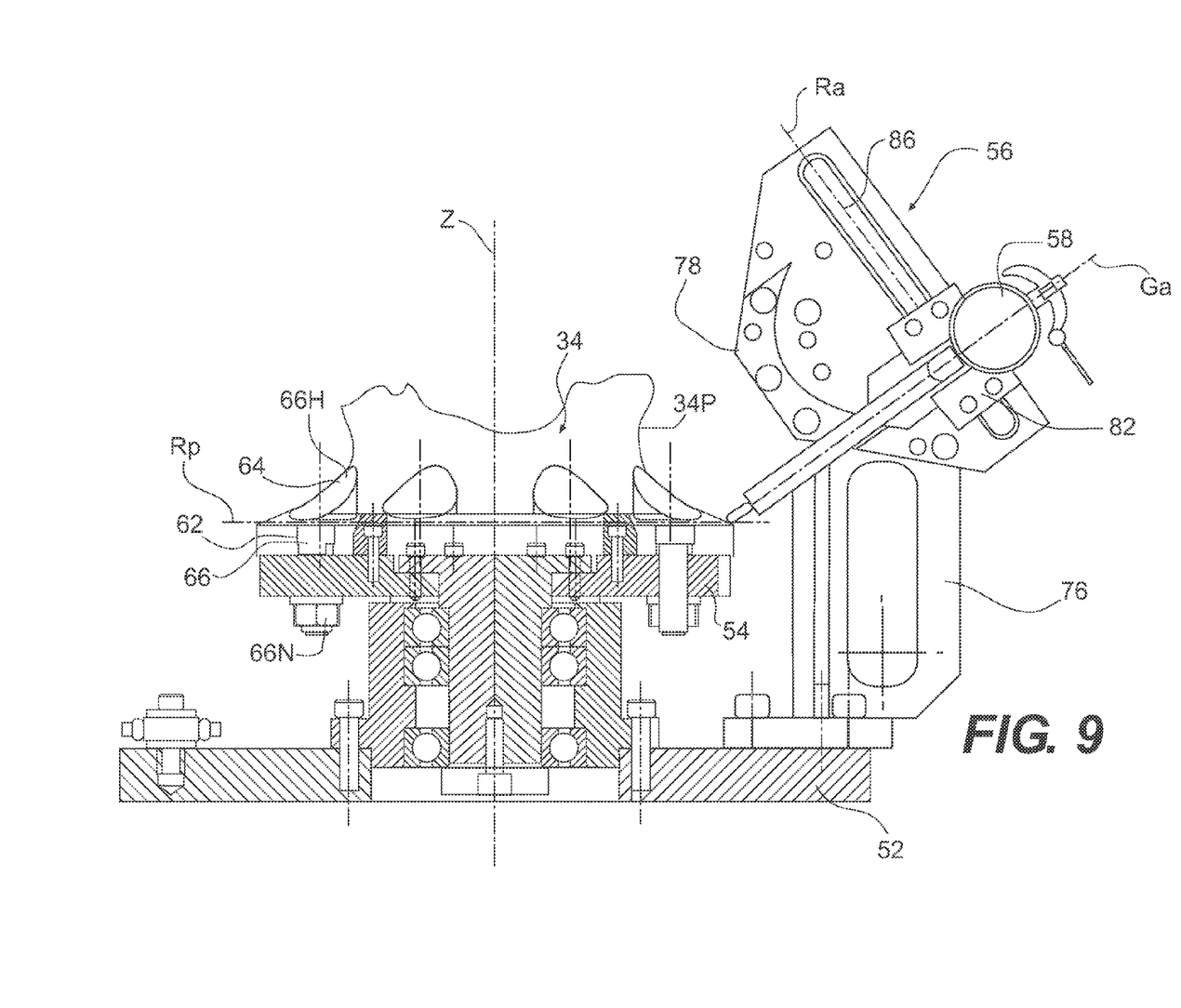
FIG. 9 is a cross-sectional view of the blade cuff measuring tool.

Referring to FIG. 9, the cam follower assembly 56 is mounted to the base 52 to support the gauge 58. The cam follower assembly 56 generally includes a support plate 76, a cam 78, a cam follower 80 and a cam follower retainer 82. The cam follower retainer 82 slidably mounts the cam follower 80 such that the cam follower 80 is movable along a gauge axis Ga relative to the cam follower retainer 82 as the cam follower 80 moves along the cam 78. Preferably, the cam follower 80 is biased relative to the cam follower retainer 82 by a spring 84 (FIG. 10) to remain in contact with the cam 78. A roller 85 (FIG. 10) is mounted to the cam follower 80 to facilitate movement of the cam follower along the cam 78. Movement along the gauge axis Ga simulates a longitudinal profile of an ideal blade cuff within a contour plane Cp (FIG. 6) which includes the axis Z.

The slot 86 guides the cam follower retainer 82 along axis Ra such that the gauge 58 is movable parallel to the axis Z to vertically position the gauge 58. As the cam follower retainer 82 is moved along the slot 86, the cam follower 80 follows the cam 78 to position the gauge 58 relative the blade cuff profile 34P by positioning the gauge 58 relative to the blade cuff profile 34P such that any deviation from an ideal blade cuff profile is measured by the gauge 58. In other words, if the blade cuff is within the predetermined tolerance variation, the gauge 58 will read zero as the cam follower 80 is moved along the cam 78. The cam 78 simulates an ideal blade cuff profile.

The cam follower retainer 82 is movable along the retainer axis Ra which is perpendicular to the gauge axis Ga. The retainer axis Ra of the cam follower retainer 82 is defined by the slot 86 in the support plate 76. Movement of the cam follower retainer 82 along the retainer axis Ra and movement of the gauge 58 along the gauge axis Ga permits measurement of any deviation from the ideal blade cuff profile. As the cam follower retainer 82 is moved along the retainer axis Ra, and the gauge 58 is moved along the gauge axis Ga in response to the cam follower retainer 82 following the cam 78, the cam follower assembly 56 defines a range of motion for the gauge 58 which corresponds to the blade cuff profile.

Figure 7:
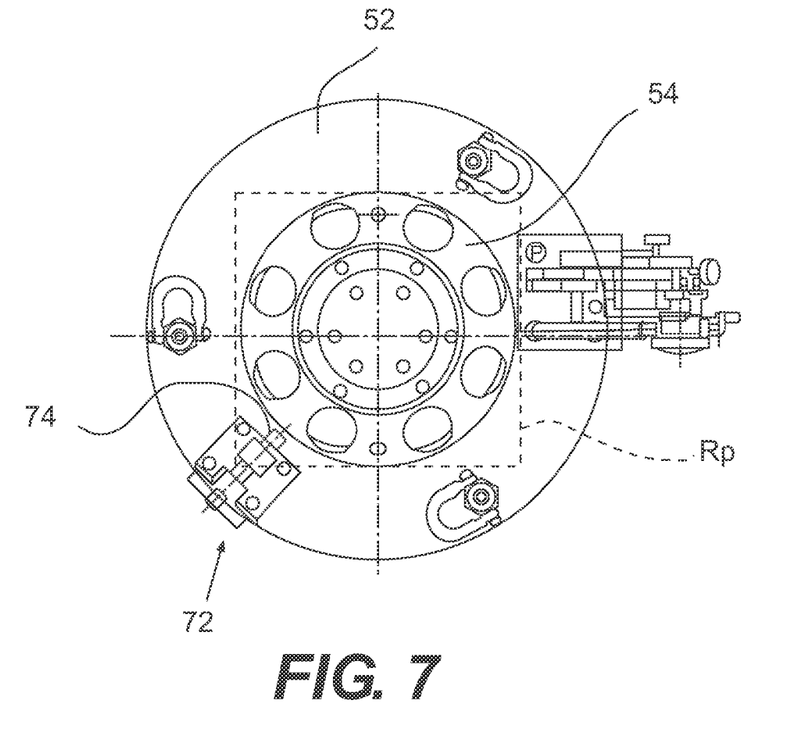
FIG. 7 is a top view of a blade cuff measuring tool.
Figures 10, 11:
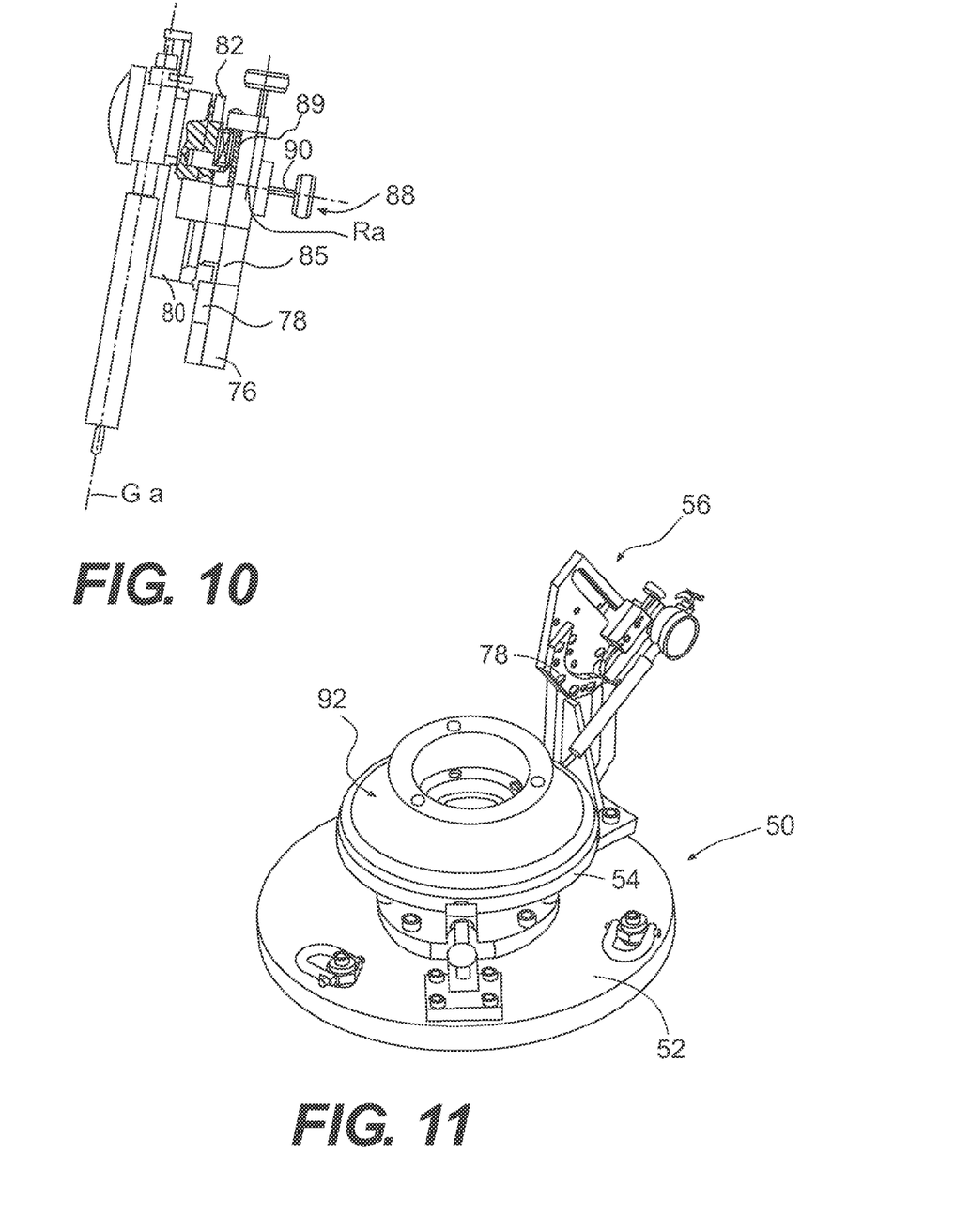
FIG. 10 is a partial cross-sectional view of a cam follower assembly and gauge mounted to the blade cuff measuring tool.
FIG. 11 is a perspective view of a blade cuff measuring tool with a master block attached thereto to zero a gauge of a cam follower assembly.

Referring to FIG. 10, a cam lock 88 is mounted to the support plate 76 to selectively lock the cam follower retainer 82 along the retainer axis Ra. A friction engagement between a cam lock pin 90 and cam follower retainer 82 provides infinitely variable position locking along axis Ra, however, other engagements may be likewise utilized. The cam lock 88 locks the gauge 58 at a desired vertical position along axis Z while permitting the gauge 58 to move along the gauge axis Ga. A radial plane defined transverse to axis Z around the blade cuff is readily measured when the cam follower retainer 82 is locked to the support plate 76. A radial measurement around the blade cuff 34 in a desired horizontal plan Rp is obtained by locking the cam follower retainer 82 and rotating the blade cuff fixture 54 relative to the base 52 about axis Z (FIGS. 7 and 9). Notably, the contoured fastener head 66H (FIG. 8A) permits the gauge 58 to move over the blade cuff attachment apertures 64 without being damaged thereby.

Referring to FIG. 11, a master block 92 is mounted to the blade cuff fixture 54. The master block 92 simulates an ideal blade cuff such that the gauge may be zeroed thereon. Once zeroed, and after removal of the master block 92, the cam 78 of the cam follower assembly 56 provides a continuous zero position for the gauge 58. The gauge is preferably a dial indicator, however, other gauges, including electronic gauging which permit mapping of the blade cuff surface will likewise be usable with the present invention.

Generally, operation of the measuring tool 50 proceeds as follows:

1) Place the master block 92 on the blade cuff fixture 54;

2) Move the gauge 58 against a point on the master block 92 and zero the gauge 58;

3) Retract the gauge 58;

4) Remove the master block 92 and replace with a blade cuff 34 to be measured;

5) Move the gauge 58 against blade cuff to obtain a zero reading;

6) Measurements may then be taken of the blade cuff profile 34P by sliding the gage along axis Ra and/or by rotating the blade cuff fixture 54.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A measuring tool for a blade cuff comprising:
    a base which defines an axis;
    a blade cuff fixture mounted to said base for rotation about said axis, said blade cuff fixture operable to retain a blade cuff along said axis;
    a cam follower assembly mounted to said base, said cam follower defining a range of motion relative to said axis which corresponds to the blade cuff; and
    a gauge mountable to said cam follower assembly.

2. The measuring tool as recited in claim 1, wherein said range of motion defines a longitudinal profile of the blade cuff relative said axis, said longitudinal profile defined within a contour plane including said axis.

3. The measuring tool as recited in claim 1, wherein said gauge includes a dial indicator.

4. The measuring tool as recited in claim 1, further comprising a cam lock which locks said gauge at a desired longitudinal position within said range of motion such that said gauge obtains a radial profile measurement of the cuff tool in response to rotation of said blade cuff fixture about said axis.

5. The measuring tool as recited in claim 1, wherein said blade cuff fixture includes a multiple of apertures which correspond with a multiple of apertures formed in the blade cuff.

6. The measuring tool as recited in claim 5, further comprising a fastener to retain the blade cuff to said blade cuff fixture, said fastener including a fastener head having a profile which corresponds to a contour profile of the blade cuff.

7. The measuring tool as recited in claim 1, further comprising a master block mountable to said blade cuff fixture, said master block having a profile equivalent to an ideal profile of the blade cuff to zero the gauge, the gauge mounted within said cam follower assembly.

8. A method of measuring a blade cuff comprising the steps of:
    (1) mounting a blade cuff of an assembled blade to a blade cuff fixture along an axis; and
    (2) moving a gauge mounted within a cam follower assembly to a position within a range of motion to measure a profile of the blade cuff at the position.

9. A method as recited in claim 8, wherein said step (2) further comprises the step of:
    moving the gauge within the cam follower to measure a longitudinal profile of the blade cuff relative to said axis, said longitudinal profile defined within a contour plane including the axis.

10. A method as recited in claim 9, further comprising the step of:
    locking the cam follower assembly; and
    rotating the blade cuff fixture about said axis to measure a radial profile of the blade cuff about the axis.

11. A method as recited in claim 8, further comprising the step of:
    mounting a master block to the blade cuff fixture, the master block having a profile equivalent to an ideal profile of the blade cuff;
    touching the gauge mounted within the cam follower assembly to the master block; and
    zeroing the gauge.

12. A method as recited in claim 8, wherein said step (1) further comprises the step of:
    mounting a main rotor blade cuff while attached to a main rotor blade assembly to the blade cuff fixture.

* * * * *

UNITED STATES PATENT AND TRADEMARK OFFICE
CERTIFICATE OF CORRECTION

| | | |
|---|---|---|
| PATENT NO. | : 7,434,328 B2 | Page 1 of 1 |
| APPLICATION NO. | : 11/040461 | |
| DATED | : October 14, 2008 | |
| INVENTOR(S) | : Landino et al. | |

It is certified that error appears in the above-identified patent and that said Letters Patent is hereby corrected as shown below:

Claim 10, Column 6, line 21: "9" should read as --8--

Signed and Sealed this

Fourteenth Day of July, 2009

JOHN DOLL
*Acting Director of the United States Patent and Trademark Office*